United States Patent

[11] 3,631,637

| [72] | Inventor | Luc Andre Tagnon |
| | | Paris, France |
| [21] | Appl. No. | 813,887 |
| [22] | Filed | Apr. 7, 1969 |
| [45] | Patented | Jan. 4, 1972 |
| [73] | Assignee | Societe Des Lunetiers, Societe en |
| | | Commandite simple a Capital Variable |
| | | Paris, France |
| [32] | Priority | Apr. 25, 1968 |
| [33] | | France |
| [31] | | 149,425 |

[54] DEVICE FOR HOLDING AND CLAMPING AN OPTICAL LENS ON AN EDGING MACHINE
4 Claims, 4 Drawing Figs.

[52] U.S. Cl. ............................................... 51/237 R, 51/101 LG
[51] Int. Cl. ........................................ B24b 17/00
[50] Field of Search ................................. 51/217, 101; 269/267, 274, 275

[56] References Cited
UNITED STATES PATENTS

| 2,447,236 | 8/1948 | Dery ........................... | 269/275 X |
| 691,225 | 1/1902 | Wilson ....................... | 51/101 |
| 475,068 | 5/1892 | Temple ...................... | 51/101 UX |
| 1,184,496 | 5/1916 | Stenvall ..................... | 51/217 |
| 1,540,832 | 6/1925 | Forster ...................... | 269/267 X |

*Primary Examiner*—Harold D. Whitehead
*Attorneys*—Robert E. Burns and Emmanuel J. Lobato

ABSTRACT: Device for holding and clamping a lens-blank on the spindle of a machine for grinding the edges of ophthalmic lenses, which comprises a fixed jaw and a clamping jaw, said jaws being coaxial, centered to the spindle axis and provided with bearing members respectively, said bearing members being adapted to engage the corresponding faces of said lens, the bearing member of at least said clamping jaw being of resilient character, this device being characterized in that said bearing member of at least one of said jaws is carried through the medium of a carrier element pivoted with at least 1° of freedom to the relevant jaw.

DEVICE FOR HOLDING AND CLAMPING AN OPTICAL LENS ON AN EDGING MACHINE

The present invention relates in general to the trimming or edge-grinding of optical or ophthalmic lenses and more particularly to a device for holding and clamping a lens on the spindle of an edging machine.

This lens holding and clamping device consists essentially of a pair of spaced coaxial jaws properly wedged on the two opposed of the spindle of a grinding machine.

With this device, the lens to be edged, which has previously been placed very accurately in relation to reference or index marks by using a known centering device so as to meet the requirements of the prescription delivered to the patient, with due consideration for the desired spectacle frames, is removed from the centering device for example by using a suction cup, a domed metal tool, a centering tong or any other suitable means, and located on one of said jaws in relation to identical reference marks carried by the machine, the lens-blank being urged an pressed against said one jaw by the other jaw of which the front bearing surface parallel to that of said one jaw is provided with a toric ring or gasket.

As long as the lens holding area is moderately asymmetrical, i.e. when the prism of which the volume would be the nearest to this area has a vertex angle of less than about 4°, the lens to be edged is held sufficiently and the operation of this conventional device is satisfactory.

On the other hand, when the value of this prism is considerably greater, as frequently observed when ophthalmic lenses of relatively low power and considerably out of center or high-power lenses moderately out of center, or lenses having a pronounced surface asymmetry are to be edged, misadjustments develop which make it almost impossible to grind with precision the desired contour, with due consideration for the inner profile of the spectacle rims and the requirements of the ophthalmologist's prescription, which determine the position of the prescribed lens in relation to the patient-and-spectacle frame assembly considered as a fixed unit. In fact, since the jaw pressure and engagement is maximum in the thickest portion of the clamping area, and minimum or zero in the thinnest portion, the grinding wheel develops torques which cause the lens to rotate in relation to the template centered with respect to the same reference marks on the spindle axis. Since the grinding operation is performed while spraying cooling liquid profusely, the lens tend to slip out from the jaws, this tendency being enhanced by the above-mentioned rotation, so that the initial adjustment is destroyed. As a consequence, the contour ground on the lens rim by the wheel differs not only in position with respect to the valuable optical element of the lens but also and frequently as to the lens shape and dimensions with respect to the prescribed or desired contour.

Finally, this asymmetry is such that the flattest the contour to be obtained, the higher the above-defined torques, thus causing frequent breakages in the case of concave lenses having a thin central area.

To avoid these various inconveniences, the present invention is based on the one hand on the principle of associating two jaws permitting the reproduction of any desired contour and so shaped as to minimize the development of undesired or stray torques, at least one of said jaws comprising pivot means providing 2° of freedom and so arranged that the lens position determined by the center ring device cannot be altered when clamping the lens, and on the other hand on the elimination of the asymmetry in the efforts exerted on the lens and therefore of the consequences of this asymmetry, whereby the complete range of ophthalmic lenses can be edged with precision.

According to another feature characterizing this invention, the front surface of each jaw carries a joint consisting of a pair of elastic studs, so that an elongated configuration can be given to the jaws which permits the edging of ophthalmic lenses having a very flat contour.

This invention will be better understood as the following description proceeds with reference to the attached drawings given by way of illustration only and wherein.

Figure 1:
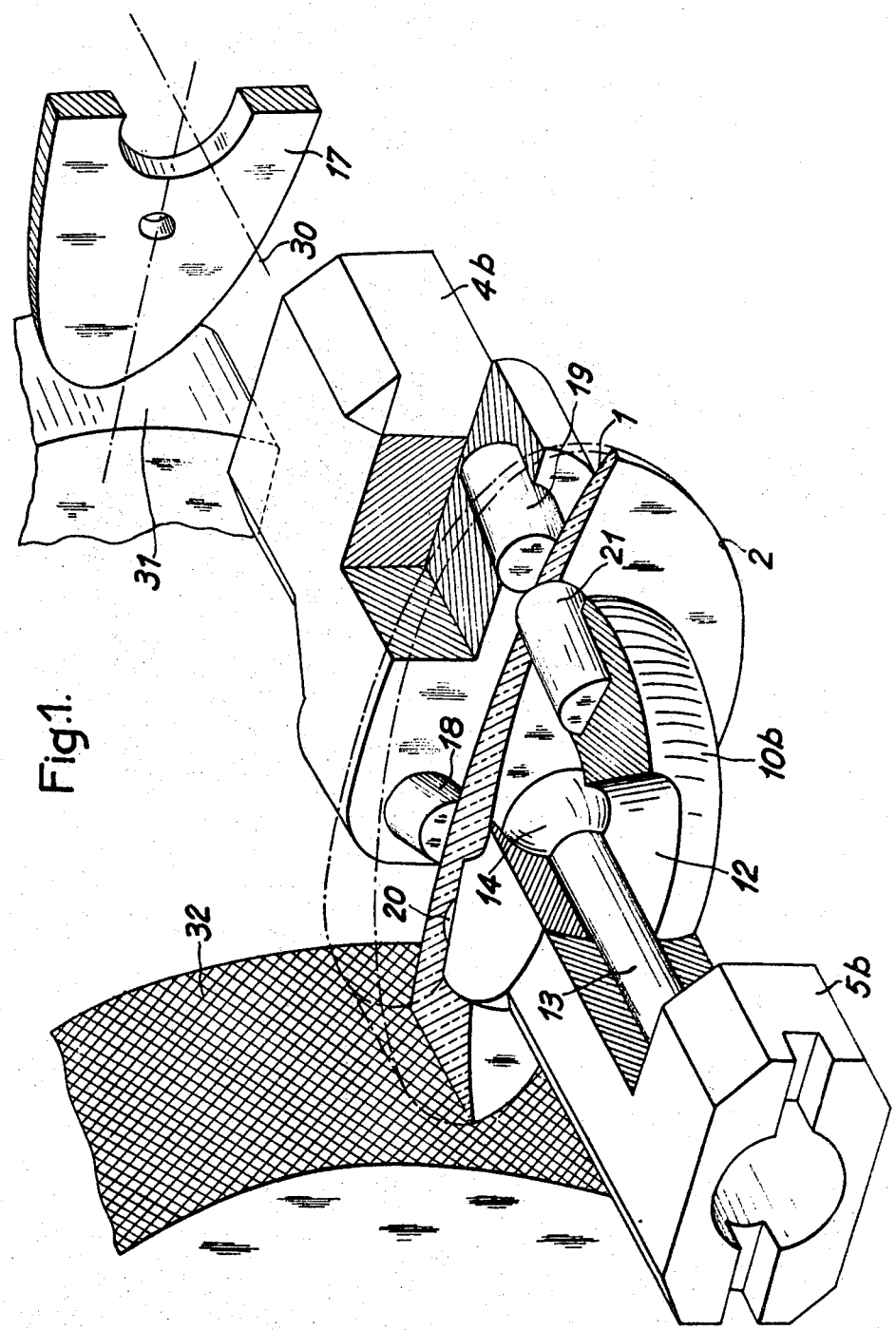
FIG. 1 is a perspective view with parts broken away showing the relative arrangement of the essential component elements of an edging machine, and more particularly the holding and clamping device according to this invention which is incorporated in the machine.

Referring first to FIG. 1, an ophthalmic lens 2 of which the face 1, which is to be disposed at right angles or substantially at right angles to the axis of vision of the future wearer of the spectacles or eyeglasses to be made therewith, is pressed against a fixed jaw 4b by a clamping jaw 5b coaxial to the fixed jaw 4b; moreover, these two jaws are centered with respect to the axis 30 of the spindle (not shown) of the edging machine.

According to this invention, the bearing face or members of jaw 5b are carried by this jaw through the intermediary of pivot means giving 2° of freedom, so that the prism of said lens 2 can only duly be taken into account when pressing this jaw against the lens surface.

The jaw 5b is wedged on a clamping device (not shown) permitting of moving this jaw parallel to itself in the direction of the spindle axis 30. The spindle on which the jaw 4b is fitted carries a template 17 of which the contour corresponds to the desired rim contour of the lens 2, this template coacting in the known fashion with a roller 31 in order to prevent the grinding wheel 32 from removing metal from the lens rim to be edged beyond the limits of this contour.

Figure 2:
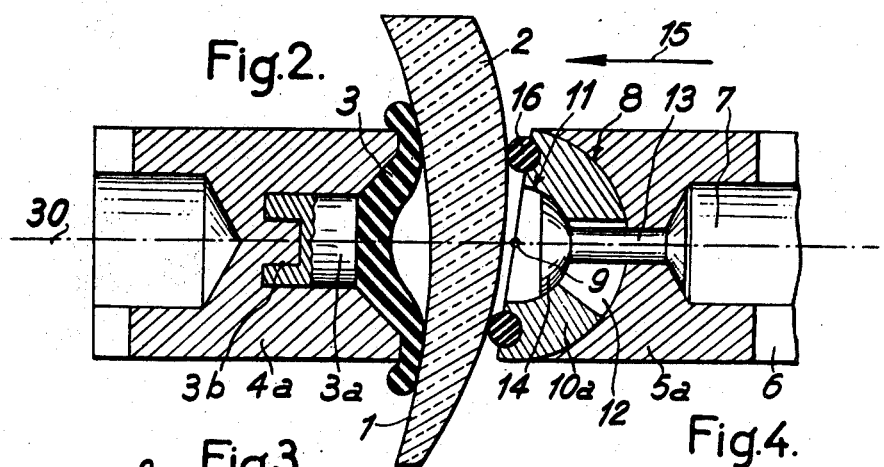
FIG. 2 is a longitudinal section showing a first form of embodiment of the holding and clamping device.

The first form of embodiment of the holding and clamping device according to this invention, which is illustrated in detail in FIG. 2, comprises a conventional fixed jaw 4a associated with an also conventional retaining and centering suction cup, and a clamping jaw 5a of which the toric ring 16 is carried by this jaw through the medium of a swivel or ball-and-socket device.

The lens 2 is centered, held and clamped as follows: In a centering device, by superimposing an image of the eye of the patient wearing his spectacle frame, for example by means of a camera lucida, the optician presses a suction cup 3 against the face 1 of lens 2, for example the face nearest to the plane perpendicular to the reference axis. The thus rigid assembly consisting of the lens 2 and suction cup 3 is fitted in the jaw 4a, the cylindrical shank 3a and the notch 3b of said suction cup 3 ensuring the proper positioning and the adjusted orientation of the centering device. The other jaw 5a secured to the machine by means of a locking device of which only the centering elements 6 and 7 are shown in the figures comprises at its end adjacent to the lens a concave part-spherical surface 8 centered about a point 9 and receiving a concentrical part-spherical convex member 10a. This member 10a comprises another concave part-spherical surface 11 concentric to the preceding ones, and the bottom of member 10a has an aperture 12 formed therethrough, as shown. A rivet 13 of which the head 14 has a part-spherical configuration complementary to said surface 11 keeps said member 10a against the part-spherical surface 8 of jaw 5a while permitting the sliding movement of said member 10a on said surface 8. The aperture 12 may have either a tapered configuration permitting the free movements of said member 10a with 2° of freedom, notably when utilizing ball-type jaws as shown in FIG. 2.

Then the optician actuates the clamping device equipping the spindle of the centering machine, so that the jaw 5a moves in the direction of the arrow 15, and when it engages the lens 2 the member 10a rotates about its center 9 and presses the toric ring 16 against the convex face of lens 2 (FIG. 2). When the effort exerted in the direction of the arrow 15 increases, the rotation of member 10a occurring about point 9 substantially in the bearing surface of the jaw and on the spindle axis 30, this toric ring 16 will not move laterally. Thus, the lens is not shifted or carried along as hitherto observed, before it is fully clamped. The lens urged while remaining parallel to itself will then squeeze the rim of suction cup 3 against the annular bearing surface of jaw 4a which is preferably provided with shallow teeth or like indentations. Under these conditions the lens 2 is centered in exactly the position imparted thereto by the centering device. The above-described swivel-joint and suction-cup assembly operates satisfactorily throughout a considerably wider range of ophthalmic lenses of which the surfaces do not depart appreciably from the spherical configuration.

However, the presence of the suction cup limits the edge-grinding operation to dimensions in excess of the diameter of the jaws utilized in the device, which is necessary for efficiently withstanding the torque exerted by the grinding wheel on the lens. Either for fashion or for minimizing the volume and therefore the weight of thick lenses, notably thick concave lenses, it may be necessary to edge lenses with very flat contours in which the maximum torque exerted by the wheel when grinding the ends is particularly high. Therefore, it would appear that the solution consists in approaching the bearing points of these ends, but this would lead to the use of bearing joints or gaskets of ovoid configuration, i.e. shapes not practicable with the nearly spherical surfaces usually encountered in the art.

Figure 3:
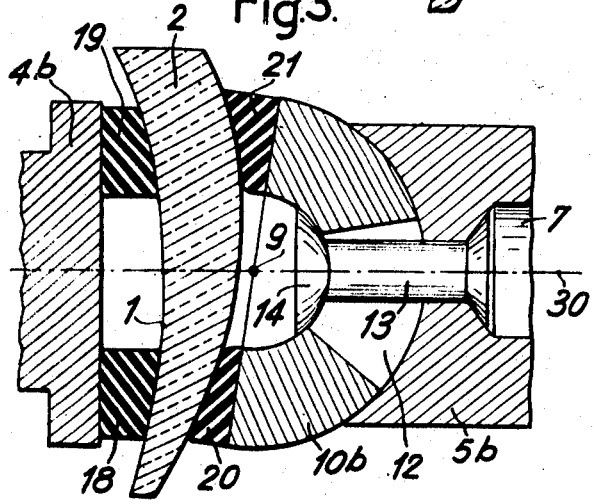
FIG. 3 is a view similar to FIG. 2 but showing a second form of embodiment similar to the one illustrated in FIG. 1.
Figure 4:
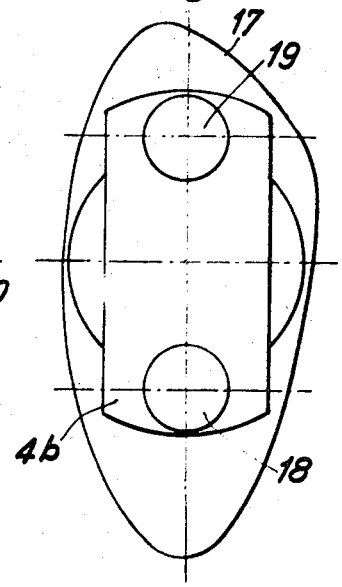
FIG. 4 is an end view of one of the jaws of the holding and clamping device illustrated in FIG. 3.

To avoid these inconveniences, this invention provides the clamping and holding device illustrated notably in FIGS. 1 and 3. The lens is inserted by means of a centering tong (not shown) and placed against the jaw 4b. This jaw is reduced to a support comprising only two rubber studs or equivalent resilient members 18 and 19 having preferably the maximum relative spacing corresponding to the smallest horizontal diameters likely to be found on the templates. Each stud has a diameter of about ¼ to 0.4 inches, and the lens-engaging surface of these studs has an average inclination easily adapted to the inclination of the lens surface by the slight distortion of said stud which is produced by the clamping action. The fixed jaw 4b may be engaged by the lens face 1 which is to be placed at right angles or at a very moderate angle to the axis of vision of the future wearer of the spectacles.

These resilient studs 18 and 19 are cemented separately to the jaw 4b, for example by inserting them into cavities formed in this jaw 4b as shown in FIG. 1, or on its front face as shown in FIG. 3, an alternate solution consisting in assembling these studs on an intermediate member cemented in turn to the jaw 4b, this intermediate member consisting for example of rubber injection moulded directly with said studs 18 and 19.

In FIG. 3 the concave face of lens 2 is held by centering tongs (not shown) against the studs 18 and 19 without modifying the position given by the centering device and a jaw 5b similar to the jaw 5a of FIG. 2 presses two studs 20 and 21 located in alignment with the aforesaid studs 18 and 19 against the lens. An intermediate member 10b can pivot or swivel to compensate the prismatic effect as already explained hereinabove. The studs 20 and 21 of jaw 5b are of same nature and have the same dimensions as the studs 18 and 19 of jaw 4b, and the bevels constituted by their lens-engaging faces are complementary to each other, as shown.

The assembly according to this invention, due to the joint action of the substantial relative spacing and of the large localized surfaces of the studs, improves considerably the lens-holding property of the device.

To avoid the necessity of properly orienting the member 10b during the clamping step, it may be noted firstly that in practice the component, on the horizontal axis, of the prismatic correction is considerably greater than the vertical component; therefore, the swivel member can be so indexed that the studs 20 and 21 remain coplanar with studs 18 and 19. This solution is permitted to many forms of embodiment of this invention.

Of course, as the above-described studs are bevelled, they must be adapted or adjusted to suit the lens surface orientation. This requirement can be met by simply replacing these studs, which can be done without difficulty according to any one of the many known methods. Alternately, this bevel may advantageously be replaced by a slightly spherical or domed convex surface providing equivalent lens-holding properties by squeezing the studs against the lens surface so that these studs can be applied indifferently to the concave or convex face of the lens to be ground.

Although in the foregoing the use of centering tongs has been contemplated, it is obvious that, considering the large space available between the studs, any other lens-locating device not partaking in the clamping action can be used, for example a simple suction cup. Similarly, the jaw 4b could be placed on the centering device and the lens 2 centered to the studs by using a suitable adhesive, for example a self-adhering tape having an adhesive coating

I claim:

1. A device for holding and clamping a lens blank on the spindle of an edging machine for optical lens comprising first and second clamping jaws, means mounting said jaws on said machine along the axis of the spindle, first and second bearing means connected respectively to said first and second jaws for bearing on respective opposed faces of a lens, said first jaw including two parts, one of said parts having a convex spherical surface portion and having said first bearing means carried thereby, and other said part having a concave spherical surface portion swivelly receiving said convex surface portion, said convex and concave surface portions having a common center of rotation disposed on the axis of the spindle and substantially in the surface of said lens engaged by said first bearing means.

2. A holding and clamping means as set forth in claim 1, wherein each of said bearing means comprises a pair of spaced studs of resilient material.

3. A holding and clamping device as set forth in claim 1, wherein said first bearing means comprises a ring of resilient material, said second bearing means comprises a detachable suction cup provided with centering means, and said second jaw is provided with complementary centering means registrable with said centering means of said second bearing means.

4. A device for holding and clamping a lens blank, as set forth in claim 1, in which the radius of curvature of said spherical portions is greater than one-half the span of contact of said first bearing means on said lens.

* * * * *